United States Patent
Ohle

(10) Patent No.: US 11,926,406 B2
(45) Date of Patent: Mar. 12, 2024

(54) HATCH LOCKING DEVICE, AND AIRCRAFT WITH HATCH LOCKING DEVICE

(71) Applicant: Airbus Operations GmbH, Hamburg (DE)

(72) Inventor: Sören Ohle, Hamburg (DE)

(73) Assignee: Airbus Operations GmbH, Hamburg (DE)

(\*) Notice: Subject to any disclaimer, the term of this patent is extended or adjusted under 35 U.S.C. 154(b) by 108 days.

(21) Appl. No.: 17/747,184

(22) Filed: May 18, 2022

(65) Prior Publication Data

US 2022/0380016 A1  Dec. 1, 2022

(30) Foreign Application Priority Data

May 31, 2021 (EP) .................................. 21176917

(51) Int. Cl.
   *B64C 1/14* (2006.01)
   *E05B 15/02* (2006.01)
   *E05B 85/24* (2014.01)

(52) U.S. Cl.
   CPC .......... *B64C 1/1415* (2013.01); *B64C 1/1423* (2013.01); *B64C 1/1461* (2013.01); *E05B 15/024* (2013.01); *E05B 85/24* (2013.01)

(58) Field of Classification Search
   CPC ....... B64C 1/14; B64C 1/1415; B64C 1/1423; B64C 1/1461; E05B 85/24; E05B 15/024; E05B 65/00
   See application file for complete search history.

(56) References Cited

U.S. PATENT DOCUMENTS

| 3,638,983 | A | * | 2/1972 | Flournoy | ............... B64C 1/1415 |
| | | | | | 292/144 |
| 4,497,462 | A | * | 2/1985 | Hamatani | ............. B64C 1/1415 |
| | | | | | 244/129.5 |

FOREIGN PATENT DOCUMENTS

| DE | 102014005234 A1 | 1/2015 |
| DE | 102019207125 A1 | 11/2020 |
| KR | 20170096439 A | 8/2017 |

OTHER PUBLICATIONS

European Search Report for Application No. 21176917 dated Oct. 28, 2021.

\* cited by examiner

*Primary Examiner* — Richard G Davis
(74) *Attorney, Agent, or Firm* — KDW Firm PLLC

(57) ABSTRACT

A hatch locking device for an aircraft hatch includes an eccentric bush which can be connected to a hatch bulkhead of the aircraft hatch panel, an inner lining which is introduced into the eccentric bush and has a bolt receptacle which is oriented centrally along a bolt receptacle axis for receiving a locking bolt, a conical pressing sleeve in the inner lining, a conical clamping sleeve, the outer conical shell face of which is in displaceable engagement with an inner conical shell face of the conical pressing sleeve, and the inner cylindrical shell face of which is flush with the outer wall of the bolt receptacle, and linear actuators which are mounted on in each case two opposite sides of the conical pressing sleeve in the inner lining and are designed to displace the conical pressing sleeve along the bolt receptacle axis with respect to the conical clamping sleeve.

15 Claims, 1 Drawing Sheet

HATCH LOCKING DEVICE, AND AIRCRAFT WITH HATCH LOCKING DEVICE

CROSS-REFERENCE TO RELATED APPLICATION

This application claims priority to European Patent Application No. 21176917.9 filed May 31, 2021, the entire disclosure of which is incorporated by reference herein.

TECHNICAL FIELD

The disclosure herein relates to a hatch locking device which can be used, for example, in the aerospace field or in automotive engineering, in particular to lock pivot-and-slide doors or rotary pivot doors in aircraft.

BACKGROUND

Pivot-and-slide doors or rotary pivot doors, what are known as "plug-type doors", are door systems which are constructed in such a way that, in the case of pressure differences between the exterior space and the internal compartment, they have a self-sealing action due to the construction principle. Doors of this type are frequently used in aircraft, in the case of which a positive pressure is built up or maintained in the interior compartment during flight. U.S. Pat. No. 4,497,462, for example, discloses a rotary pivot door of this type as cargo hold hatch for the cargo hold of an aircraft.

High tensile forces act during the flight, in particular, in the case of relatively large aircraft doors or hatches, such as cargo hold hatches, for example. In addition, high load differences, for example in comparison between an unloaded and loaded cargo hold, can lead to deformations or deflections occurring in the region of the hatch gaps, which deformations or deflections can impair the correct orientation of the hatch locking elements with respect to one another.

Document DE 10 2014 005 234 A1 discloses a clamping device for holding tubes or rods.

SUMMARY

It is one of the objects of the disclosure herein to find solutions for hatch locking systems which center the hatch during closure itself. Furthermore, it is one of the objects of the disclosure herein to find solutions for hatch locking systems which can dissipate extremely great tensile forces into the frame region of the hatch in a small installation space.

These and further objects are achieved by a hatch locking device and an aircraft hatch disclosed herein.

In accordance with a first aspect of the disclosure herein, a hatch locking device for an aircraft hatch comprises an eccentric bush which can be connected to a hatch bulkhead of the aircraft hatch panel, an inner lining which is introduced into the eccentric bush and has a bolt receptacle which is oriented centrally along a bolt receptacle axis for receiving a locking bolt, a conical pressing sleeve which is arranged in the inner lining, a conical clamping sleeve, the outer conical shell face of which is in displaceable engagement with an inner conical shell face of the conical pressing sleeve, and the inner cylindrical shell face of which is flush with the outer wall of the bolt receptacle, and linear actuators which are mounted on in each case two opposite sides of the conical pressing sleeve in the inner lining and are designed to displace the conical pressing sleeve along the bolt receptacle axis with respect to the conical clamping sleeve.

In accordance with a second aspect of the disclosure herein, an aircraft hatch comprises a hatch panel with hatch bulkheads and hatch skin elements, a hatch locking device in accordance with the first aspect of the disclosure herein which is mounted in the hatch panel, a hatch frame region with a locking bolt which is driven via a two-way linear actuator and is guided along the bolt receptacle axis in a frame bolt receptacle, a frame eccentric bush which is connected to a hatch frame bulkhead, and a frame inner lining which is introduced into the frame eccentric bush and in which an inner conical shell face of a frame conical pressing sleeve is in displaceable engagement with an outer conical shell face of a frame conical clamping sleeve, and in which frame linear actuators which are attached on in each case two opposite sides of the frame conical pressing sleeve are designed to displace the frame conical pressing sleeve along the bolt receptacle axis with respect to the frame conical clamping sleeve in order to clamp in or release the locking bolt.

In accordance with a third aspect of the disclosure herein, an aircraft comprises an aircraft hatch in accordance with the second aspect of the disclosure herein. In some embodiments, the aircraft hatch can be a cargo hold hatch which is configured, in particular, as a rotary pivot hatch.

An essential concept of the disclosure herein includes providing a bolt closure for an aircraft hatch, which bolt closure can transmit forces and torques in all directions. In particular, high tensile loads can be dissipated effectively into the bulkhead structure of the aircraft in a small installation space on account of the actively actuated clamping. In the case of mounting in a typical aircraft hatch frame, bolt tensile forces induce, in particular, torsional moments in the C-bulkheads, with the result that the clamping force can be increased.

Manufacturing tolerances of the hatch panel and/or the hatch frame can advantageously be compensated for translationally in all directions; the hatch locking device makes self-centring of the hatch during closure and self-centring of the locking bolt during locking possible. In addition, one particular advantage results from the actively actuated, in particular hydraulic bolt drive which increases the reliability of the locking and unlocking.

Advantageous refinements and developments are disclosed in the description with reference to the figures.

In accordance with some embodiments of the hatch locking device according to the disclosure herein, the linear actuators can be hydraulic cylinders which can be loaded with oil pressure, for example.

In accordance with some embodiments of the hatch locking device according to the disclosure herein, the conical pressing sleeve can be secured against rotation about the bolt receptacle axis in the inner lining via a feather key.

In accordance with some further embodiments of the hatch locking device according to the disclosure herein, the conical pressing sleeve and/or the conical clamping sleeve can be slotted one time or multiple times, and partially or over the entire length of the respective conical sleeve body. In some design variants, the conical clamping sleeve can be secured against rotation about the bolt receptacle axis by way of interlocking of its slot or a groove of a segment via a lug of the inner lining. As an alternative to this, it can also be possible in some design variants for the conical clamping sleeve to be provided with a sleeve lug or a lug on one of its segments, which can then be secured in a corresponding groove in the inner lining. Both of these variants make it possible to exert a homogeneous contact pressure on the locking bolt around the entire bolt shell face.

In accordance with some further embodiments of the hatch locking device according to the disclosure herein, the inner lining can be of crowned configuration on the frame side. This advantageously makes centring of the hatch in the frame during closure possible. In some embodiments, the inner lining can have a bolt guiding chamfer at the opening of the bolt receptacle. This can ensure that the locking bolt is centered in the hatch-side clamping device during locking, in order for it to be possible for deviations due to the operating load to be compensated for.

In accordance with some further embodiments of the hatch locking device according to the disclosure herein, furthermore, the hatch locking device can comprise a force dissipation tube which is screwed via a tube sleeve to a connecting tube which is mounted on the hatch side. The force dissipation tube can be configured, for example, as an extension piece of the inner lining. By way of this configuration, clamping devices which lie opposite one another on different sides of the hatch and consist in each case of a conical pressing sleeve and a conical clamping sleeve can be connected through the hatch panel body, with the result that a transmission of tensile and compressive forces becomes possible without loading of the hatch.

In accordance with some further embodiments of the hatch locking device according to the disclosure herein, the conical clamping sleeve can taper along the bolt receptacle axis towards the opening of the bolt receptacle. It can be particularly advantageous here if the outer conical shell face of the conical clamping sleeve and the inner conical shell face of the conical pressing sleeve are provided with a coating, such as Teflon for example, which decreases the static friction between the conical clamping sleeve and the conical pressing sleeve. If, in particular, the friction between the conical sleeves is lower than the friction between the locking bolt and the conical clamping sleeve and between the conical pressing sleeve and the inner lining, a self-locking action of the locking bolt in the bolt receptacle can be achieved in the clamped state.

In accordance with some embodiments of the aircraft hatch according to the disclosure herein, the two-way linear actuator can be a hydraulic cylinder which is extended via a spacer sleeve into the frame region in the direction of the bolt receptacle axis, in order to be able to receive the locking bolt in the spacer sleeve in the unlocked state. Manufacturing-induced spacing tolerances between the frame and the hatch can be compensated for by way of a variable axial position of the inner lining with respect to the eccentric bush. A freedom from load of the two-way linear actuator can be ensured, for example, via an active freewheel state, such as, for instance, simultaneous opening of the inlet and outlet valve in the case of a hydraulic actuator. The axial forces can be tapped off at the spacer sleeve and conducted into the further fuselage structure.

In accordance with some further embodiments of the aircraft hatch according to the disclosure herein, furthermore, the aircraft hatch can have a frame-side hatch seal which is mounted on a hatch frame bulkhead.

In accordance with some further embodiments of the aircraft hatch according to the disclosure herein, the outer conical shell face of the frame conical clamping sleeve and the inner conical shell face of the frame conical pressing sleeve can be provided with a coating, such as Teflon for example, which decreases the static friction between the frame conical clamping sleeve and the frame conical pressing sleeve. If, in particular, the friction between the conical frame sleeves is lower than the friction between the locking bolt and the frame conical clamping sleeve and between the frame conical pressing sleeve and the frame inner lining, a self-locking action of the locking bolt in the frame-side bolt receptacle can be achieved in a clamped state.

The above refinements and developments can be combined in any desired manner with one another, if appropriate. Further possible refinements, developments and implementations of the disclosure herein also comprise combinations which have not been mentioned explicitly of features of the disclosure herein described above or in the following text with regard to the example embodiments. Here, in particular, a person skilled in the art will also add individual aspects as improvements or additions to the respective basic form of the disclosure herein.

BRIEF DESCRIPTION OF THE DRAWINGS

In the following text, the disclosure herein will be described in greater detail on the basis of the example embodiments which are indicated in the diagrammatic figures, in which.

The appended figures are intended to impart further understanding of the embodiments of the disclosure herein. They illustrate embodiments and, in conjunction with the description, serve to explain principles and concepts of the disclosure herein. Other embodiments and many of the stated advantages result with regard to the drawings. The elements of the drawings are not necessarily shown true to scale with respect to one another. Directional terminology such as, for instance, "top", "bottom", "left", "right", "above", "below", "horizontal", "vertical", "front", "rear" and similar specifications are used merely for explanatory purposes and do not serve to restrict the generality to specific embodiments as shown in the figures.

In the figures of the drawings, identical, functionally identical and identically acting elements, features and components are provided in each case with the same designations, unless stated otherwise.

DETAILED DESCRIPTION

Figure 1:
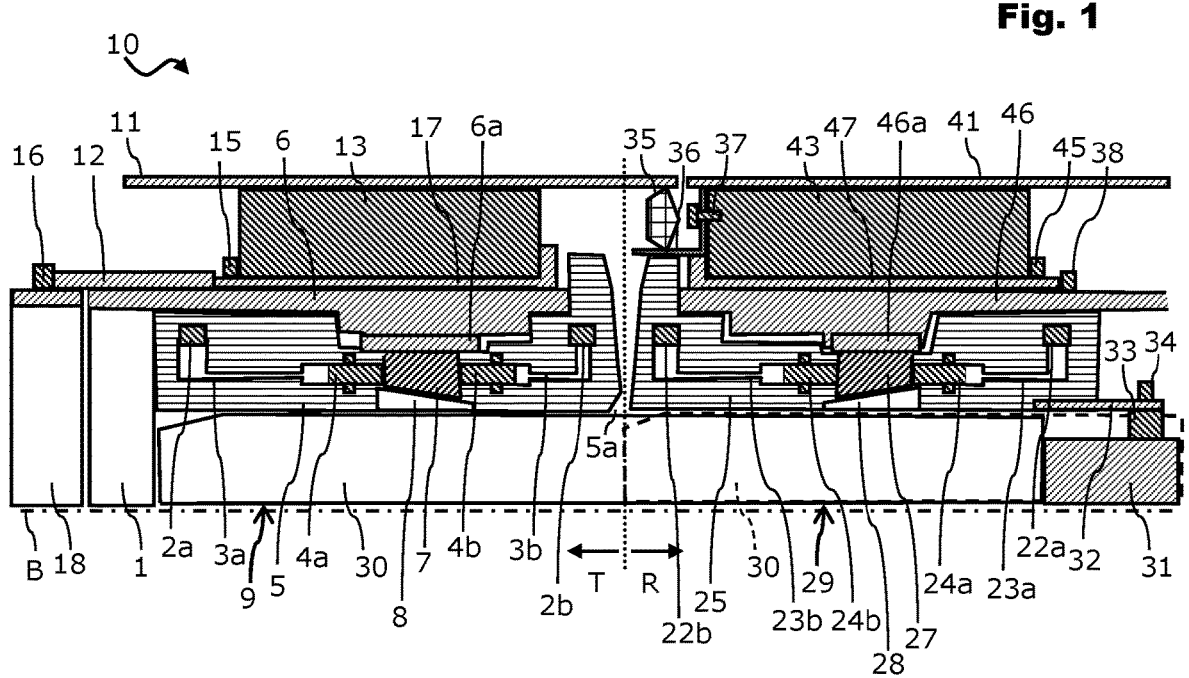
FIG. 1 shows a diagrammatic illustration of a longitudinal section through a region around a hatch gap of an aircraft hatch with a hatch locking device in accordance with one embodiment of the disclosure herein.
Figure 2:
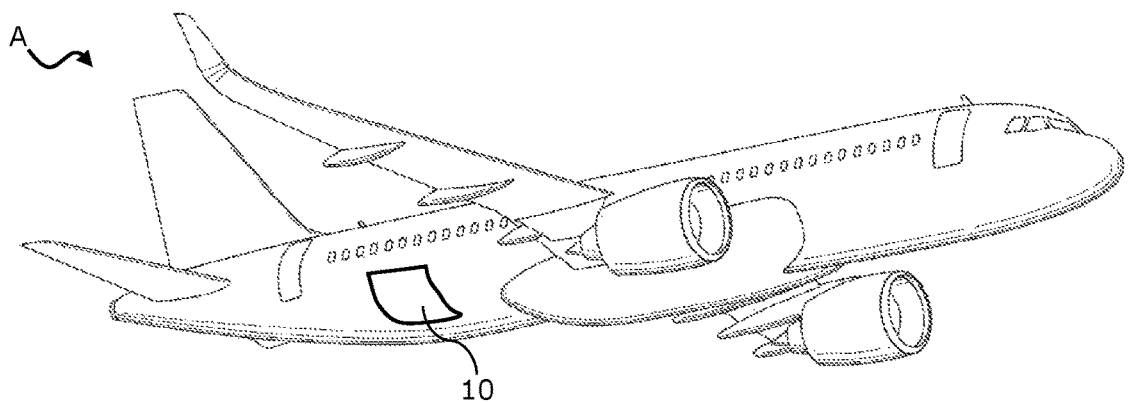
FIG. 2 shows a diagrammatic illustration of an aircraft with an aircraft hatch in accordance with one embodiment of the disclosure herein which has at least one hatch locking device.

FIG. 1 shows a diagrammatic illustration of a longitudinal section through a region around a hatch gap of an aircraft hatch with a hatch locking device 10. Here, the aircraft hatch which is shown can be, for example, a pivot-and-slide door or a rotary pivot door which can be configured, in particular, as a cargo hold hatch of an aircraft, such as, for instance, of the aircraft A of FIG. 2.

FIG. 1 shows the hatch section T which lies, without restriction of the generality, on the left in the image, and the frame section R which lies on the right in the image. If the hatch is closed, a hatch panel skin element 11 lies close to a frame skin element 41. The outer gap which is produced as a result can be closed in as fluid-tight a manner as possible by way of a hatch seal 35, such as a foam or rubber lip, for example. The hatch seal 35 can be connected fixedly to a C-bulkhead in the hatch frame region R via a mounting bracket 36 and a screw connection 37.

An eccentric bush 17 can be connected to a hatch bulkhead 13 of the hatch, for example a C-bulkhead. An inner lining part 6 is introduced into the eccentric bush 17, which inner lining part 6 can be connected in the extension of its rotational axis to a force dissipation tube 1. In its interior, a second inner lining part 5 has an actively actuable clamping device. The clamping device comprises an outer (as viewed radially) conical pressing sleeve 7 with a conical inner cut-out and an inner (as viewed radially) conical clamping sleeve 8 with a conical outer shell face and a cylindrical inner cut-out.

The second inner lining part 5 is a bolt receptacle 9 which is oriented centrally along a bolt receptacle axis B for receiving a locking bolt 30. The locking bolt 30 is pushed from the frame section R (unlocked state shown using dashed lines) via a two-way linear actuator 31 along the bolt receptacle axis B into the hatch section T, and is guided into the bolt receptacle 9. To this end, the locking bolt 30 can be chamfered on the end side, just like the second inner lining part 5 which can have a bolt guiding chamfer 5a at the gap-side end and at the level of the opening of the bolt receptacle axis B. The locking bolt can advantageously be self-centered during the locking operation by way of the chamfers of the locking bolt 30 and/or the second inner lining part 5. In addition, the second inner lining part 5 can be of crowned configuration on the frame side, in order for it to be possible for the hatch to be centered automatically in the frame during closing.

The conical pressing sleeve 7 can be secured against rotation via a feather key 6a in the first inner lining part 6. This ensures seating with an accurate fit of the conical pressing sleeve 7 which is arranged coaxially with respect to the inner lining in the radial and circumferential direction of the first inner lining part 6, without impairing the movability along the bolt receptacle axis B. The conical clamping sleeve 8 is flushed by way of its inner cylindrical shell face with the outer wall of the bolt receptacle 9, with the result that the inner cylindrical shell face bears flatly, in the case of an introduced locking bolt 30, against the outer circumferential face of the latter. By virtue of the fact that the conicity of the two conical sleeves 7 and 8 is identical, the outer conical shell face of the conical clamping sleeve 8 is in displaceable engagement with the inner conical shell face of the conical pressing sleeve 7. Therefore, a displacement of the conical pressing sleeve 7 can take place along the bolt receptacle axis B, in order to press the conical clamping sleeve 8, clamped fixedly in the inner lining part 5 along the bolt receptacle axis B, to a more or less firm extent on to the outer circumferential face of the locking bolt 30, depending on the position of the conical pressing sleeve 7.

Two linear actuators 4a, 4b are mounted for actuation purposes in the inner lining part 5 on in each case two opposite sides of the conical pressing sleeve 7, for example (as shown) hydraulic cylinders 4a, 4b which are fluidically connected in each case via hydraulic fluid feed lines 3a, 3b to hydraulic inlets 2a, 2b. The hydraulic inlets 2a, 2b can be loaded with hydraulic oil pressure, for example, in order to bring about an alternating displacement of the conical pressing sleeve 7, depending on the actuating hydraulic cylinder 4a, 4b. An actuation of the hydraulic cylinder 4b brings about an increase in the clamping action on the locking bolt 30 and, in contrast, an actuation of the hydraulic cylinder 4a brings about a decrease in the clamping action on the locking bolt 30.

The conical pressing sleeve 7 and the conical clamping sleeve 8 can in each case be slotted, such that the slots lie offset by 180° with respect to one another. Here, one or more slots can be made in the conical sleeves 7 and 8, with the result that the conical sleeves 7 and 8 are segmented. For example, the sleeve segments can be produced from a single sleeve, and the slots can be made only partially along the sleeve axis, that is to say not over the entire length of the sleeve main body, for example by a side milling cutter. One of the advantages of multiply slotted and, as a result, segmented conical sleeves consists in the free radial movability.

The one or more slots can ensure that the contact pressure on the locking bolt 30 is exerted in a manner which is distributed as homogeneously as possible around the circumference of the locking bolt 30. Furthermore, the conical clamping sleeve 8 can be secured in the second inner lining part 5 against rotation about the bolt receptacle axis B. This can take place, for example, by way of interlocking of a slot of the conical clamping sleeve 8 with a corresponding lug on the second inner lining part 5. As an alternative to this, the conical clamping sleeve 8 can also have a sleeve lug which is then introduced into a groove which corresponds to it in the second inner lining part 5. If the conical pressing sleeve 7 is fixed rotationally via a feather key 6a with respect to the first inner lining part 6, the conical clamping sleeve 8 is also fixed with respect to the first inner lining part 6. The rotationally fixed positioning of the two inner lining part 5 and 6 in relation to one another therefore automatically results in rotational fixing of the two conical sleeves among one another.

As FIG. 1 shows by way of example, the conical clamping sleeve 8 tapers along the bolt receptacle axis B towards the opening of the bolt receptacle 9; that is to say, the clamping action can achieve a self-locking action of the locking bolt 30 if the outer conical shell face of the conical clamping sleeve 8 and the inner conical shell face of the conical pressing sleeve 7 are provided with a coating which decreases the static friction between the conical clamping sleeve 8 and the conical pressing sleeve 7. A coating of this type can be Teflon, for example. In contrast to this, the inner cylindrical shell face of the conical clamping sleeve 8 can be uncoated, or can even be coated in a manner which promotes the static friction.

In order to mount the hatch locking device 10, the eccentric bush 17 including the inner lining 5, 6 can first of all be inserted into the hatch and rotated until manufacturing tolerances are compensated for. To this end, an auxiliary bolt can be inserted, for example, temporarily into the bolt receptacle 9 for orientation purposes. Afterwards, the eccentric bush 17 can be secured, for example, via a nut 15. The spacing from the hatch gap in the interior of the hatch can be set in a variable manner via a tube sleeve 12 with a corresponding nut securer 16 on a connecting tube 18 which is mounted on the hatch side. To this end, the tube sleeve 12 bears against the rear (that is to say, hatch inner-side) end of the eccentric bush 17. A gap can then be set to the desired spacing from the hatch gap between the inner lining part 5 and the hatch outer-side end of the eccentric bush 17. As a result, tolerance compensation can take place in the axial direction.

Via the force dissipation tube 1 which is screwed to the connecting tube 18 by the tube sleeve 12, a transmission of tensile and compressive forces of the frame can take place without loading of the hatch.

A complementary device can likewise be mounted on the frame side. To this end, a two-way linear actuator 31 is secured via a connection 33 to a spacer sleeve 32 via a nut 34 in the hatch frame region R. This extended spacer sleeve 32 serves for corresponding extension into the hatch frame region R, in order for it to be possible for the locking bolt 30 to be received in the spacer sleeve 32 in the unlocked state. The two-way linear actuator 31 can be, for example, a hydraulic cylinder and serves to guide the locking bolt 30 from a frame bolt receptacle 29 along the bolt receptacle axis B into the hatch-side hatch locking device 10. Axial forces are for the greatest part dissipated in a non-positive manner via the conical sleeves 27 and 28 into the bulkhead 43. Via the spacer sleeve 32, axial forces can be dissipated and distributed to a lesser extent into the surrounding structure of the bulkhead 43 in the hatch frame region R.

A frame eccentric bush 47 is connected to a hatch frame bulkhead 43 and is secured via a nut 45 in the hatch frame region R, in a similar manner to the hatch section T. An introduced frame inner lining consisting of or comprising single-part or multiple-part lining components 25 and 46 is installed in the frame eccentric bush 47, in which frame inner lining an inner conical shell face of a frame conical pressing sleeve 27 is in displaceable engagement with an outer conical shell face of a frame conical clamping sleeve 28. Depending on the orientation, the frame inner lining can be secured in the frame eccentric bush 47 via a screw connection in order to compensate for axial manufacturing-induced tolerances.

Frame linear actuators 24a, 24b, such as, for example, hydraulic cylinders with feed lines 23a, 23b and corresponding fluid inlets 22a, 22b, are installed in the inner lining component 25. These frame linear actuators 24a, 24b lie on in each case two opposite sides of the frame conical pressing sleeve 27, and are designed to displace the frame conical pressing sleeve 27 along the bolt receptacle axis B with respect to the frame conical clamping sleeve 28 in order to clamp in or release the locking bolt 30.

Once again, the frame conical pressing sleeve 27 can be secured against rotation in the inner lining part 46 via a feather key 46a. This ensures seating with an accurate fit of the frame conical pressing sleeve 27 in the radial circumferential direction of the frame bolt receptacle 29, without impairing the movability along the bolt receptacle axis B. The frame conical clamping sleeve 28 is flush by way of its inner cylindrical shell face with the outer wall of the frame bolt receptacle 29, with the result that the inner cylindrical shell face bears flatly against the outer circumferential face of the locking bolt 30. By virtue of the fact that the conicity of the two conical sleeves 27 and 28 is identical, the outer conical shell face of the frame conical clamping sleeve 28 is in displaceable engagement with the inner conical shell face of the frame conical pressing sleeve 27. Therefore, a displacement of the frame conical pressing sleeve 27 can take place along the bolt receptacle axis B, in order to press the frame conical clamping sleeve 28, clamped fixedly in the lining component 25 along the bolt receptacle axis B, to a more or less firm extent onto the outer circumferential face of the locking bolt 30, depending on the position of the frame conical pressing sleeve 27.

An actuation of the hydraulic cylinder 24b brings about an increase in the clamping action on the locking bolt 30 and, in contrast, an actuation of the hydraulic cylinder 24a brings about a decrease in the clamping action on the locking bolt 30.

The frame conical pressing sleeve 27 and the frame conical clamping sleeve 28 can in each case be slotted, such that the slots lie offset by 180° with respect to one another. It can be ensured as a result that the contact pressure on the locking bolt 30 is exerted in a manner which is distributed as homogeneously as possible around the circumference of the locking bolt 30. Furthermore, the frame conical clamping sleeve 28 can be secured in the frame inner lining against rotation about the bolt receptacle axis B. This can take place, for example, by way of interlocking of a slot of the frame conical clamping sleeve 28 with a corresponding lug on the frame inner lining. As an alternative to this, the frame conical clamping sleeve 28 can also have a sleeve lug which is then introduced into a groove which corresponds to it in the frame inner lining. If the frame conical pressing sleeve 27 is fixed rotationally with respect to the frame inner lining via a feather key 26a, the frame conical clamping sleeve 28 is also fixed with respect to the frame inner lining. Rotational fixing of the two conical sleeves among one another therefore automatically results via interlocking with the frame conical pressing sleeve 27.

As is shown by way of example in FIG. 1, the frame conical clamping sleeve 8 tapers along the bolt receptacle axis B towards the opening of the frame bolt receptacle 29; that is to say, a self-locking action of the locking bolt 30 can be achieved by way of the clamping action if the outer conical shell face of the frame conical clamping sleeve 28 and the inner conical shell face of the frame conical pressing sleeve 27 are provided with a coating which decreases the static friction between the frame conical clamping sleeve 28 and the frame conical pressing sleeve 27. A coating of this type can be Teflon, for example. In contrast to this, the inner cylinder shell face of the frame conical clamping sleeve 28 can be uncoated or can even be coated in a manner which promotes the static friction.

The linear actuators 4a, 4b, 24a and 24b can fundamentally comprise every known type, every configuration and every mechanism for producing a linear drive actuation or stroke movement. The linear actuators can comprise, for example, pneumatically or hydraulically driven piston/cylinder arrangements or an electric linear motor or an electric, hydraulic or pneumatic rotation motor which drives a trapezoidal thread spindle and a thread follower or a rack and a pinion, for example. These piston/cylinder arrangements are preferably driven hydraulically; as an alternative, however, they can also be driven pneumatically.

The described hatch locking devices can generally be used in all areas of the transport industry, for example for road motor vehicles, for rail vehicles, for aircraft or for watercraft, but also for portable containers. In particular, the described hatch locking devices can be used for doors or hatches with high tensile loads during operation, such as for cargo hold hatches of aircraft, for instance.

In the preceding detailed description, various features for improving the rigor of the presentation have been combined in one or more examples. It should be clear here, however, that the above description is merely of an illustrative but in no way restrictive nature. It serves to cover all the alternatives, modifications and equivalents of the various features and example embodiments. In view of the above description, many other examples will be immediately and directly clear to a person skilled in the art on account of their expert knowledge.

The example embodiments have been selected and described in order for it to be possible to present the principles which form the basis of the disclosure herein and their possible uses in practice as satisfactorily as possible. As a result, experts can modify and utilize the disclosure herein and its various example embodiments in an optimum manner with regard to the intended purpose. In the claims and the description, the terms "containing" and "having" are used as neutral terminologies for the corresponding term "comprising".

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hatch locking device for an aircraft hatch, comprising:
   an eccentric bush which can be connected to a hatch bulkhead of the aircraft hatch panel;
   an inner lining which is introduced into the eccentric bush and has a bolt receptacle which is oriented centrally along a bolt receptacle axis for receiving a locking bolt;
   a conical pressing sleeve which is in the inner lining;
   a conical clamping sleeve, the outer conical shell face of which is in displaceable engagement with an inner conical shell face of the conical pressing sleeve, and the inner cylindrical shell face of which is flush with an outer wall of the bolt receptacle; and
   linear actuators which are mounted on in each case two opposite sides of the conical pressing sleeve in the inner lining and are configured to displace the conical pressing sleeve along the bolt receptacle axis with respect to the conical clamping sleeve.

2. The hatch locking device according to claim 1, wherein the conical pressing sleeve and/or the conical clamping sleeve is slotted one time or multiple times in each case partially or over an entire length of the conical sleeve body.

3. The hatch locking device according to claim 2, wherein the conical clamping sleeve is secured against rotation about the bolt receptacle axis either by interlocking of its slot or a groove of a segment via a lug of the inner lining or by a sleeve lug of the conical clamping sleeve or a lug on one of its segments in a corresponding groove in the inner lining, and the conical pressing sleeve being fixed with respect to rotation about the bolt receptacle axis in the inner lining via a feather key.

4. The hatch locking device according to claim 1, wherein the linear actuators are hydraulic cylinders.

5. The hatch locking device according to claim 1, comprising a force dissipation tube which is screwed via a tube sleeve to a connecting tube which is mounted on a hatch side.

6. The hatch locking device according to claim 1, wherein the conical clamping sleeve tapers along the bolt receptacle axis towards an opening of the bolt receptacle.

7. The hatch locking device according to claim 6, wherein the outer conical shell face of the conical clamping sleeve and the inner conical shell face of the conical pressing sleeve comprise a coating which decreases static friction between the conical clamping sleeve and the conical pressing sleeve.

8. The hatch locking device according to claim 1, wherein the inner lining comprises a crowned configuration on a frame side and/or having a bolt guiding chamfer at an opening of the bolt receptacle.

9. An aircraft hatch, comprising:
   a hatch panel with hatch bulkheads and hatch skin elements;
   a hatch locking device according to claim 1 which is mounted in the hatch panel;
   a hatch frame region with a locking bolt which is driven via a two-way linear actuator and is guided along the bolt receptacle axis in a frame bolt receptacle;
   a frame eccentric bush which is connected to a hatch frame bulkhead; and
   a frame inner lining which is introduced into the frame eccentric bush and in which an inner conical shell face of a frame conical pressing sleeve is in displaceable engagement with an outer conical shell face of a frame conical clamping sleeve, and in which frame linear actuators which are attached on in each case two opposite sides of the frame conical pressing sleeve are configured to displace the frame conical pressing sleeve along the bolt receptacle axis with respect to the frame conical clamping sleeve to clamp in or release the locking bolt.

10. The aircraft hatch according to claim 9, wherein the two-way linear actuator is a hydraulic cylinder which is extended via a spacer sleeve into the frame region in a direction of the bolt receptacle axis, to be able to receive the locking bolt in the spacer sleeve in an unlocked state.

11. The aircraft hatch according to claim 9, comprising a frame-side hatch seal which is mounted on a hatch frame bulkhead.

12. The aircraft hatch according to claim 9, wherein the outer conical shell face of the frame conical clamping sleeve and the inner conical shell face of the frame conical pressing sleeve comprise a coating which decreases static friction between the frame conical clamping sleeve and the frame conical pressing sleeve.

13. The aircraft hatch according to claim 9, wherein the locking bolt is chamfered on an end side.

14. An aircraft with an aircraft hatch according to claim 9.

15. The aircraft according to claim 14, wherein the aircraft hatch is configured as a cargo hold hatch.

* * * * *